Patented Nov. 8, 1949

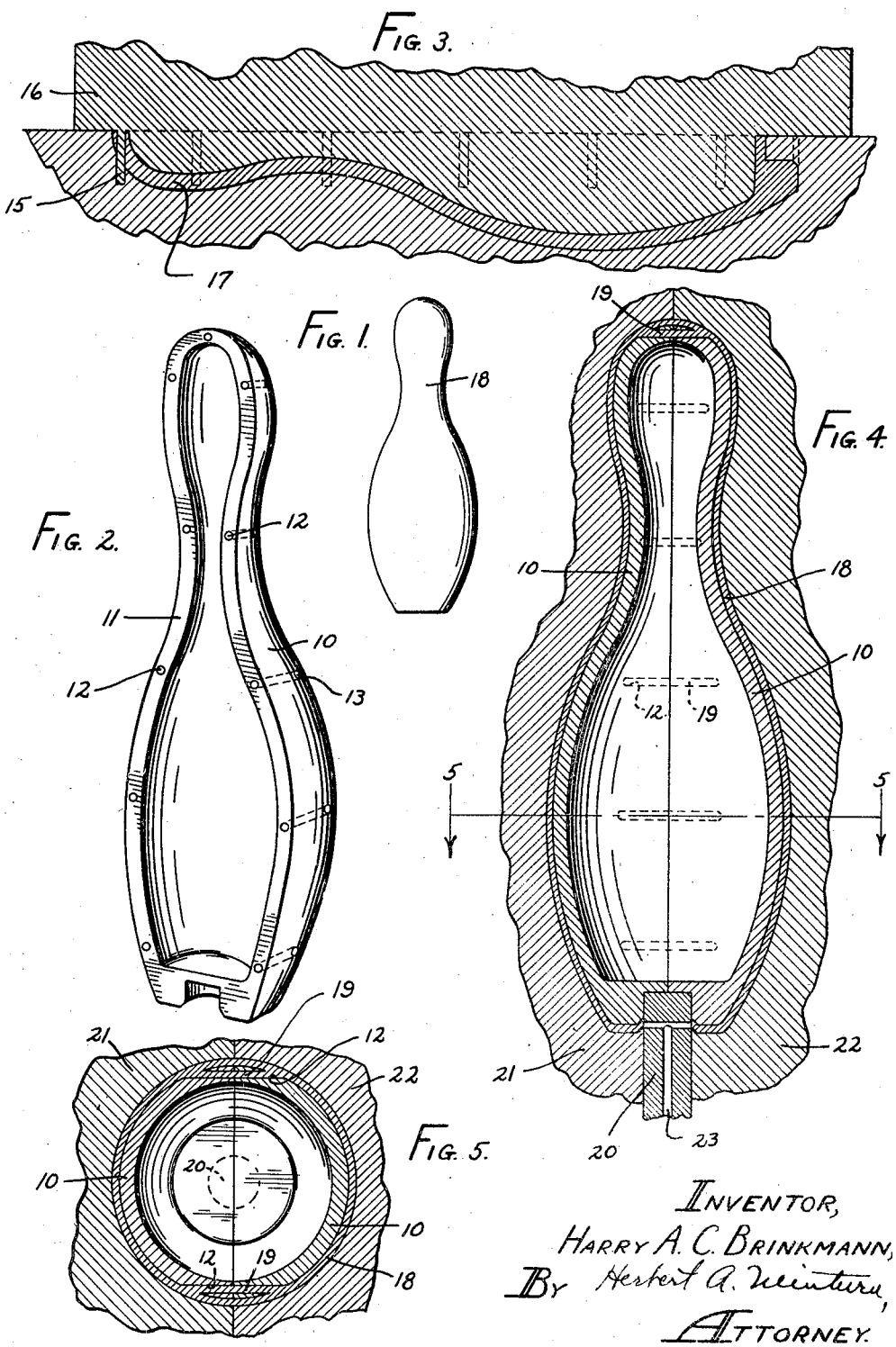

2,487,218

UNITED STATES PATENT OFFICE 2,487,218

HOLLOW BOWLING PIN

Harry A. C. Brinkmann, Indianapolis, Ind.

Application January 31, 1946, Serial No. 644,447

1 Claim. (Cl. 273—82)

This invention relates to a bowling pin which is formed by building up a core out of sections and enclosing that core in a continuous envelope without joints or breaks therein. A primary object of the invention is to provide a bowling pin which will be extremely durable over a long period of usage as opposed to the heretofore solid wood pin, and at the same time will have all of the desirable characteristics of a wood pin including the rebound and sound effects as well as comparable weight.

These and other objects and advantages of the invention will become apparent to those versed in the art in the following description of the invention, as illustrated in the accompanying drawing, in which Fig. 1 is a view in side elevation on a much reduced scale of a bowling pin embodying the invention;

Fig. 2, a view in perspective of a pin core section;

Fig. 3, a view in section through a mold for forming the core section;

Fig. 4, a view in vertical transverse section through a mold for applying the envelope about assembled cores; and Fig. 5, is a view in transverse section on a line 5—5 through the envelope mold.

Like characters of reference indicate like parts throughout the several views in the drawing.

I form a plurality of core sections 10 herein shown as two in number and each section constituting one-half of the complete core. Each core section 10 may be made out of any suitable material, preferably of a synthetic resin or plastic material setting to the proper degree of hardness, or it may be made out of laminated wood or metal. Regardless of the material selected, the section is formed in the nature of a shell, the outer surface of which has the general contour of the finished pin, but is reduced in dimension to permit building thereover to the final, required standard size.

Each of these sections 10 is provided with a matching face 11. Where but two sections are employed to build up the core as in the present showing, this face 11 falls into the central vertical plane through the pin. Each section 10 is provided with a plurality of passageways 12 entering from the matching face 11 and continuing back through the wall of the core to open therefrom such as by openings 13 at a distance around the wall from the face 11. In the present showing, this passageway 12 continues normally from the face 11 in each core as indicated in Fig. 5.

The core 10 may be formed in any suitable manner such as by molding as suggested in the mold form of Fig. 3 where pins 15 of a male section 16 of the mold are carried down across the cavity in which the material 17 of the core is filled so as to have the passageways 12 formed at the time of molding.

Taking two of the sections 10 thus formed, they are placed face to face as indicated in Figs. 4 and 5 and then the envelope material 18 is formed therearound in a substantially uniform layer to have that material 18 flow through the passageways 12 to form anchor keys 19 integrally uniting spaced apart regions of the envelope 18 through the passageways 12, thereby forming keys or dowels preventing shifting of the core sections 10 within the envelope material 18 as well as aiding in retaining the material 18 in close adhesion to the outer surfaces of the sections 10.

One method of applying the envelope material 18 to the core sections 10 is suggested in Fig. 4 where the sections 10 are mounted on the end of a pin 20 inserted in the cavity of mold parts 21 and 22. Then the material 18 is flowed through the passageway 23 of the pin 20 into the cavity surrounding the core sections 10 within those mold parts 21 and 22 so as to completely envelop the sections and to flow through the matching passageways 12. Preferably this material 18 is any one of the well-known plastics suitable for injection molding and setting either with or without application of heat. The plastic selected will have a degree of resilience and yet the envelope will not become unduly distorted due to the backing up of the core sections 10 therewithin.

Thus it is to be seen that by the simple and unique manner of forming hollow sections and then interconnecting those sections by a continuous encircling envelope, I can form a bowling pin of any desired weight and reaction to impact by the bowling ball depending upon the thickness of core walls; thickness of the envelope wall; and choice of materials employed in both the core and the envelope. While the invention has been shown and described in the one particular form, it is obvious that structural variations as well as different materials may be employed without departing from the spirit of the invention, and I therefore do not desire to be limited to that precise form beyond the limitations as may be employed by the following claim.

I claim:

A bowling pin having two hollow, symmetrical, mating shell sections each abutting the other at matching face areas in a central longitudinal, vertical plane; each of said sections being provided with a plurality of passageways substantially normal to and centrally of said face areas, said passageways being continuous from openings respectively in the outer surfaces of both of said sections through matching openings in said abutting face areas; an outer enveloping wall circumferentially extending around said sections in a continuous, circumferential envelope holding said sections together; and wall ties extending integrally from said wall through said outer surface openings of one of said sections continuously through said passageways of said one of said sections, through said openings in said matching face areas through said passageways of the other of said sections, and being joined integrally with said wall through the outer surface openings in said other of said sections.

HARRY A. C. BRINKMANN.

REFERENCES CITED

The following references are of record in the file of this patent:

UNITED STATES PATENTS

| Number | Name | Date |
| --- | --- | --- |
| 1,536,606 | Bishop et al. | May 5, 1925 |
| 1,568,313 | Bluhm | Jan. 5, 1926 |
| 2,166,950 | German et al. | July 25, 1939 |
| 2,180,676 | Guimond | Nov. 21, 1939 |
| 2,289,872 | Brinkmann | July 14, 1942 |